United States Patent
Kennedy et al.

(10) Patent No.: US 9,942,264 B1
(45) Date of Patent: Apr. 10, 2018

(54) SYSTEMS AND METHODS FOR IMPROVING FOREST-BASED MALWARE DETECTION WITHIN AN ORGANIZATION

(71) Applicant: Symantec Corporation, Mountain View, CA (US)

(72) Inventors: Mark Kennedy, Gardena, CA (US); Pieter Viljoen, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/381,140

(22) Filed: Dec. 16, 2016

(51) Int. Cl.
*H04L 29/06* (2006.01)
*H04L 12/24* (2006.01)

(52) U.S. Cl.
CPC .......... *H04L 63/145* (2013.01); *H04L 41/145* (2013.01); *H04L 63/1416* (2013.01)

(58) Field of Classification Search
CPC .. H04L 63/145; H04L 63/1416; H04L 41/145
See application file for complete search history.

(56) References Cited

U.S. PATENT DOCUMENTS

| | | | |
|---|---|---|---|
| 9,306,962 B1 * | 4/2016 | Pinto | ................... H04L 63/1416 |
| 2009/0281981 A1 * | 11/2009 | Chen | .................... G06K 9/6282 |
| | | | 706/56 |
| 2012/0054184 A1 * | 3/2012 | Masud | .............. G06F 17/30598 |
| | | | 707/737 |
| 2013/0304676 A1 * | 11/2013 | Gupta | .................. G06N 99/005 |
| | | | 706/12 |
| 2014/0279745 A1 * | 9/2014 | Esponda | ................ G06N 5/043 |
| | | | 706/12 |
| 2015/0213389 A1 * | 7/2015 | Modarresi | ........ G06Q 10/06393 |
| | | | 705/7.39 |
| 2015/0254555 A1 * | 9/2015 | Williams, Jr. | ....... G06N 3/0454 |
| | | | 706/14 |
| 2015/0304349 A1 * | 10/2015 | Bernstein | ............ H04L 63/1425 |
| | | | 726/22 |

(Continued)

OTHER PUBLICATIONS

Kuncheva, Ludmila I., "Classifer Ensembles for Changing Environments", Proc. 5th Int. Workshop on Multiple Classifer Systems, Cagliari, Italy Springer-Verlag, LNCS, 3077, 2004, pp. 1-15.*

(Continued)

*Primary Examiner* — Michael Pyzocha
(74) *Attorney, Agent, or Firm* — FisherBroyles, LLP

(57) ABSTRACT

The disclosed computer-implemented method for improving forest-based malware detection within an organization may include (i) receiving, at a backend computing system, organization data from at least one organization computing device within an organization computer network, (ii) adjusting, at the backend computing system, a general use forest model based on the organization data to generate an organization-specific forest model for detecting malicious computer files within the organization computer network, and (iii) sending, from the backend computing system, the organization-specific forest model to the at least one organization computing device. Various other methods, systems, and computer-readable media are also disclosed.

17 Claims, 6 Drawing Sheets

(56) References Cited

U.S. PATENT DOCUMENTS

| | | | |
|---|---|---|---|
| 2015/0339477 A1* | 11/2015 | Abrams | G06F 21/554 |
| | | | 726/23 |
| 2015/0379264 A1* | 12/2015 | Alme | G06F 21/564 |
| | | | 726/23 |
| 2016/0078361 A1* | 3/2016 | Brueckner | G06N 99/005 |
| | | | 706/12 |
| 2016/0127319 A1* | 5/2016 | Xiong | H04L 63/0263 |
| | | | 726/1 |
| 2016/0260023 A1* | 9/2016 | Miserendino, Jr. | G06F 17/30 |
| 2017/0017793 A1* | 1/2017 | Davis | G06F 21/565 |
| 2017/0061254 A1* | 3/2017 | Burgos | G06K 9/3241 |
| 2017/0061322 A1* | 3/2017 | Chari | G06N 99/005 |
| 2017/0124325 A1* | 5/2017 | Alme | G06F 21/56 |

OTHER PUBLICATIONS

Sanz, Borja et al., "MAMA: Manifest Analysis for Malware Detection in Android", Journal Cybernetics and Systems, vol. 44, 2013—Issue 6-7: Intelligent Network Security and Survivability, 19 pages (Year: 2013).*

Khurram Shahzad, Raja et al., "Detecting Scareware by Mining Variable Length Instruction Sequences", Information Security for South Africa, 2011, 9 pages. (Year: 2011).*

Markham; ROC curves and Area Under the Curve explained; http://www.dataschool.io/roc-curves-and-auc-explained/, as accessed Dec. 13, 2016; Data School; Nov. 20, 2014.

Receiver operating characteristic; https://en.wikipedia.org/wiki/Receiver_operating_characteristic, as accessed Dec. 14, 2016; Wikipedia; Apr. 23, 2004.

Kennedy et al.; U.S. Appl. No. 15/193,653, filed Jun. 27, 2016.

\* cited by examiner

SYSTEMS AND METHODS FOR IMPROVING FOREST-BASED MALWARE DETECTION WITHIN AN ORGANIZATION

BACKGROUND

Computing networks are frequently attacked by emerging malware threats that cannot be adequately identified and countered by common signature-based detection systems. Accordingly, heuristic detection models are increasingly utilized in the fight against malware. These heuristic models often utilize multiple forest models to evaluate files for potential threats. Forest models have grown in size over time and multiple forest models are often used simultaneously to more accurately classify files and identify threats.

A broad sample of data is commonly used to build and train forest models. The data is often obtained from a wide variety of files and locations, including multiple different organizations. Such an approach may produce forest models that are able to be utilized by a wide variety of end users and organizations. However, the forest models may perform better for some end users and organizations than for others. The instant disclosure, therefore, identifies and addresses a need for systems and methods for improving forest-based malware detection within an organization.

SUMMARY

As will be described in greater detail below, the instant disclosure describes various systems and methods for improving forest-based malware detection within an organization.

In one example, a method for improving forest-based malware detection within an organization may include (i) receiving, at the backend computing system, organization data from at least one organization computing device within an organization computer network, (ii) adjusting, at the backend computing system, a general use forest model based on the organization data to generate an organization-specific forest model for detecting malicious computer files within the organization computer network, and (iii) sending, from the backend computing system, the organization-specific forest model to the at least one organization computing device. In one example, the general use forest model and the organization-specific forest model may each be random forests.

In some embodiments, adjusting the general use forest model may include changing, at the backend computing system, a weight of at least one leaf node of the general use forest model to generate the organization-specific forest model. In various examples, adjusting the general use forest model may include training, at the backend computing system, the general use forest model using the organization data. Adjusting the general use forest model may also include changing, at the backend computing system, a conviction threshold of the general use forest model to generate the organization-specific forest model. In one example, changing the conviction threshold may include calculating a conviction threshold for the organization-specific forest model by (i) running, at the backend computing system, the organization data through the general use forest model to determine true positive rates and false positive rates for each leaf node of the general use forest model with respect to the organization data, (ii) generating, at the backend computing system, a receiver operating characteristic curve based on the true positive rates and the false positive rates for each leaf node, and (iii) selecting, at the backend computing system, a position along the receiver operating characteristic curve, the position corresponding to the updated conviction threshold.

In at least one embodiment, the method may further include (i) receiving, at the backend computing system, additional organization data from the at least one organization computing device within the organization computer network and (ii) evaluating, at the backend computing system, performance of the general use forest model with respect to the additional organization data by running the additional organization data through the general use forest model. The organization data may comprise file data of at least one computer file from the at least one organization computing device. The method may additionally include categorizing, at the backend computing system, the file data of the at least one computer file. In some examples, the general use forest model may include a forest model that was generated and trained using data from sources outside the organization computer network.

In various embodiments, adjusting the general use forest model may further include adjusting, at the backend computing system, the general use forest model based on the organization data to generate an organization-specific forest model that exhibits higher malware detection accuracy in comparison to the general use forest model when utilized to evaluate data within the organization computer network. Adjusting the general use forest model may further include adjusting, at the backend computing system, the general use forest model based on the organization data to generate an organization-specific forest model that exhibits at least one of higher true positive rates and lower false positive rates in comparison to the general use forest model when utilized to evaluate data within the organization computer network. In some embodiments, the method may include determining that a computer file includes malware based on an analysis of the computer file using the organization-specific forest model. The method may also include performing a security action to protect the at least one organization computing device when the computer file is determined to include malware. The method may additionally include categorizing, at the backend computing system, the organization data received from the at least one organization computing device.

In one embodiment, a system for improving forest-based malware detection within an organization may include several modules stored in memory, including (i) a receiving module, stored in memory, that receives, at a backend computing system, organization data from at least one organization computing device within an organization computer network, (ii) an adjusting module, stored in memory, that adjusts, at the backend computing system, a general use forest model based on the organization data to generate an organization-specific forest model for detecting malicious computer files within the organization computer network, (iii) a sending module, stored in memory, that sends, from the backend computing system, the organization-specific forest model to the at least one organization computing device, and (iv) at least one processor that executes the receiving module, the adjusting module, and the sending module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at the backend computing system, organization data from at least one organization computing device within an organization computer network, (ii) adjust, at the backend computing system, a general use forest model based on the organization data to generate an organization-specific forest model for detecting malicious computer files within the organization computer network, and (iii) send, from the backend computing system, the organization-specific forest model to the at least one organization computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
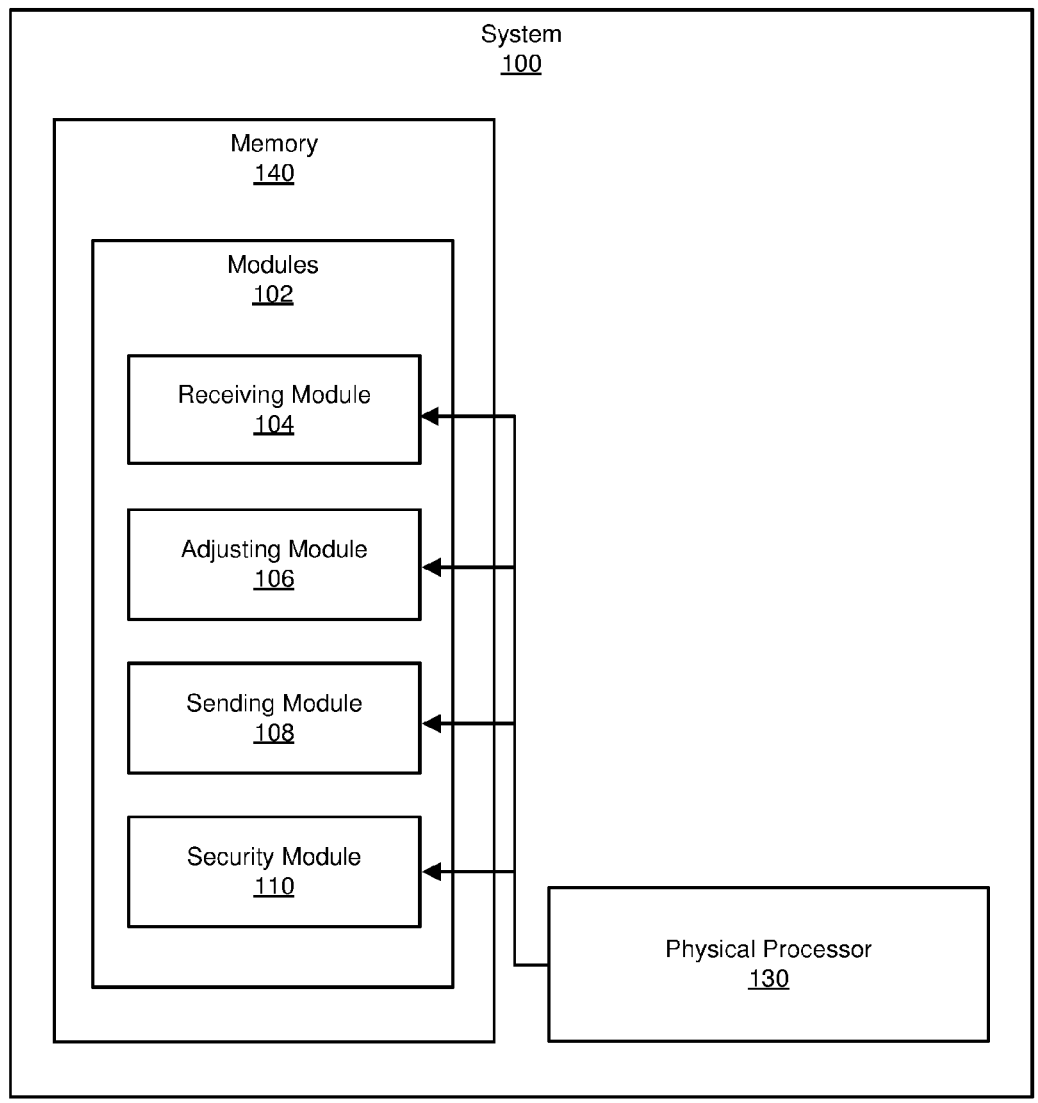
FIG. 1 is a block diagram of an example system for improving forest-based malware detection within an organization.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for improving forest-based malware detection within an organization. As will be explained in greater detail below, the systems and methods described herein may improve early detection and prevention of malware attacks within an organization by optimizing classification forest performance for the organization. The systems and methods may use computer files from the organization to adjust classification forests for use in the organization. The systems and methods described herein may improve the functioning of a computing device by facilitating early detection of malware, thereby improving the security of the computing device and reducing time and resources expended to repair the computing device in the event that it is compromised by malware. These systems and methods may also improve the field of computer security by optimizing forest performance for particular organizations in order to better detect malware while reducing the occurrence of false-positive detections within the organizations.

Figure 2:
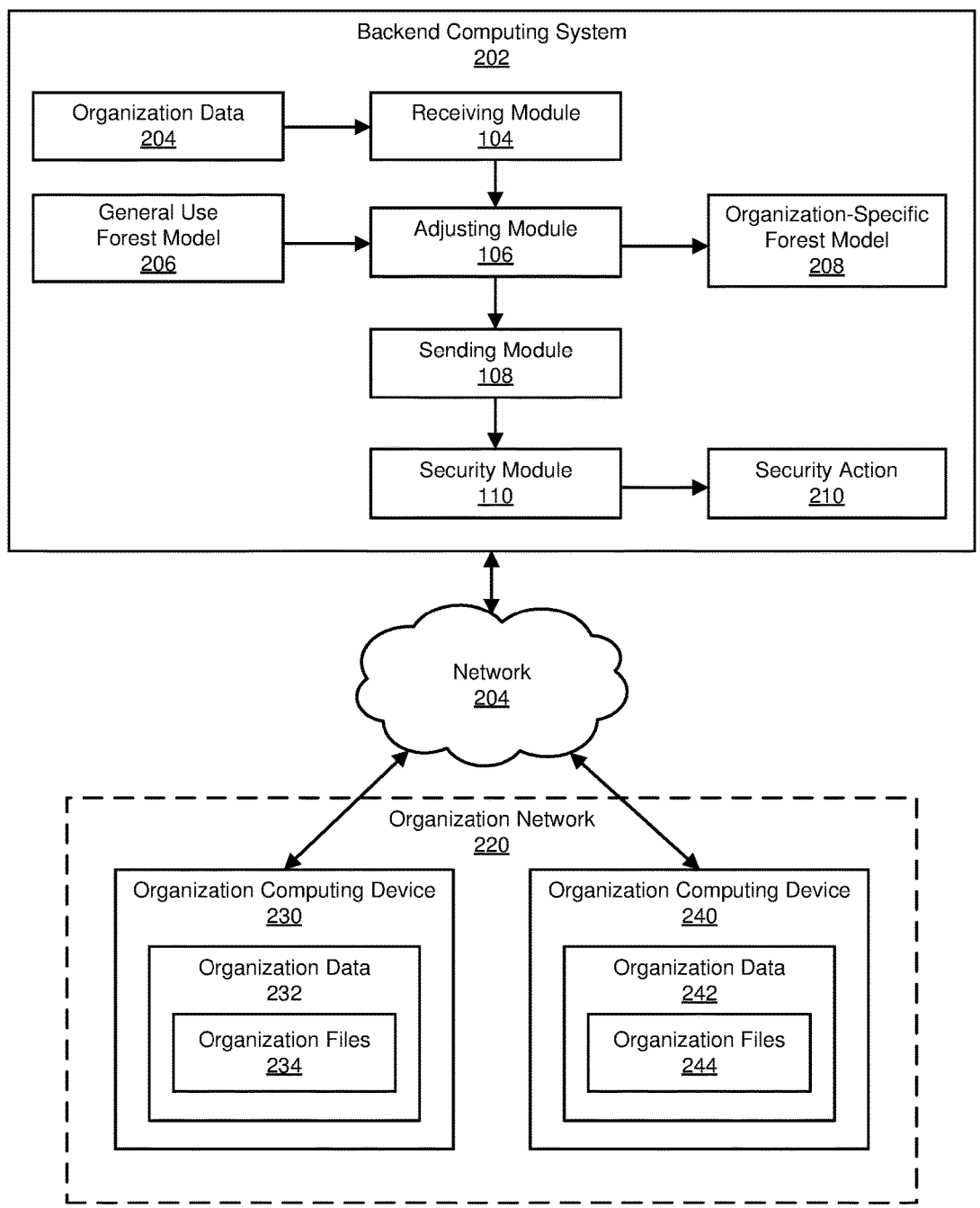
FIG. 2 is a block diagram of an additional example system for improving forest-based malware detection within an organization.

The following will provide, with reference to FIGS. 1-2, detailed descriptions of example systems for improving forest-based malware detection within an organization. Detailed descriptions of corresponding computer-implemented methods will also be provided in connection with FIG. 3. Detailed descriptions of example classification forest models for detecting malware will be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for improving forest-based malware detection within an organization. As illustrated in this figure, example system 100 may include one or more modules 102 for performing one or more tasks. As will be explained in greater detail below, exemplary system 100 may include a receiving module 104 that receives, at a backend computing system, organization data from at least one organization computing device within an organization computer network. In addition, exemplary system 100 may include an adjusting module 106 that adjusts, at the backend computing system, a general use forest model based on the organization data to generate an organization-specific forest model for detecting malicious computer files within the organization computer network. Exemplary system 100 may further include a sending module 108 that sends, from the backend computing system, the organization-specific forest model to the at least one organization computing device. In some embodiments, exemplary system 100 may include a security module 110 that determines whether a computer file includes malware based on an analysis of the computer file using the organization-specific forest model and performs a security action to protect the at least one organization computing device when the computer file is determined to include malware. Although illustrated as separate elements, one or more of modules 102 in FIG. 1 may represent portions of a single module or application.

The terms "forest," "random forest," "classification forest," and "forest model" as used herein generally refer to a heuristic ensemble learning technique for classification and/or sorting of file data. A forest may include a plurality of decision trees that are each trained independently using a common set of data. Data, such as file data, may be run through each of the trees in the forest model and the output of the of the forest model may be used to classify and/or sort the data. For example, a forest model may be used by a security service to classify files and identify potentially malicious files. In some embodiments, individual files may each be run through a plurality of forests in order to determine whether the files are safe or malicious.

The term "security action," as used herein, generally refers to one or more actions the systems described herein may take after determining that a file likely includes some type of malware. For example, security actions may include, without limitation, preventing the file from performing any actions on the computing device, alerting an administrator to the potential maliciousness of the file, quarantining the file, deleting the file, blocking a download of the file, and/or warning a user about the file. In addition, the systems described herein may perform a security action on objects other than a file. For example, the systems described herein may blacklist malicious URLs and/or IP addresses, such as URLs and/or IP addresses from which a malicious file originated.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., backend computing system 202, organization computing device 230, and/or organization computing device 240), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate improving forest-based malware detection within an organization. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a backend computing system 202 in communication with one or more computers within an organization network 220. For example, backend computing system 202 may be in communication with an organization computing device 230 and an organization computing device 240 via network 204. In one example, all or a portion of the functionality of modules 102 may be performed by backend computing system 202, organization computing device 230, organization computing device 240, and/or any other suitable computing system. As will be described in greater detail below, one or more of modules 102 from FIG. 1 may, when executed by at least one processor of backend computing system 202, organization computing device 230, and/or organization computing device 240, enable backend computing system 202, organization computing device 230, and/or organization computing device 240 to improve forest-based malware detection within an organization.

In one embodiment, backend computing system 202 may be programmed with one or more of modules 102 from FIG. 1. In some examples, and as will be described in greater detail below, receiving module 104 may receive, at backend computing system 202, organization data 204 from at least one of organization computing device 230 and organization computing device 240 within organization network 220. For example, organization computing device 230 may include organization data 232 and organization computing device 240 may include organization data 242, at least a portion of which may be sent to backend computing system 202 as organization data 204. In some embodiments, organization data, such as organization data 204, organization data 232, and/or organization data 242, may include file data. For example, organization data 232 may include organization files 234 and organization data 242 may include organization files 244.

Adjusting module 106 may adjust, at backend computing system 202, a general use forest model 206 based on organization data 204 to generate an organization-specific forest model 208 for detecting malicious computer files within organization network 220. Sending module 108 may send, from backend computing system 202, organization-specific forest model 208 to at least one of organization computing device 230 and organization computing device 240. Security module 110 may determine, at backend computing system 202, that a computer file includes malware based on an analysis of the computer file using organization-specific forest model 208. Additionally, security module 110 may perform a security action 210 to protect organization computing device 230, organization computing device 240, and/or any other computing devices within organization network 220 when the computer file is determined to include malware.

Backend computing system 202 generally represents any type or form of computing system capable of reading computer-executable instructions that provides a security service to computing devices connected to network 204 from malicious attacks and preserve data integrity. Examples of backend computing system 202 include, without limitation, security servers, application servers, web servers, storage servers, and/or database servers configured to run certain software applications and/or provide various security, web, storage, and/or database services. Although illustrated as a single entity in FIG. 2, backend computing system 202 may include and/or represent a plurality of servers and/or computing devices that work and/or operate in conjunction with one another.

Organization computing device 230 and organization computing device 240 each generally represent any type or form of computing device for an organization that are capable of reading computer-executable instructions. Examples of organization computing device 230 and/or organization computing device 240 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device. Additional examples of organization computing device 230 and/or organization computing device 240 may include, without limitation, security servers, application servers, web servers, storage servers, and/or database servers configured to run certain software applications and/or provide various security, web, storage, and/or database services for the organization.

Network 204 generally represents any medium or architecture capable of facilitating communication or data transfer. In one example, network 204 may facilitate communication between backend computing system 202, organization computing device 230, and/or organization computing device 240. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Organization network 220 generally represents any medium or architecture capable of facilitating communication or data transfer for an organization. In one example, organization network 220 may facilitate communication between organization computing device 230, organization computing device 240, and/or any additional computing systems belonging to and/or related to the organization. In this example, organization network 220 may facilitate communication or data transfer using wireless and/or wired connections. Examples of network 220 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
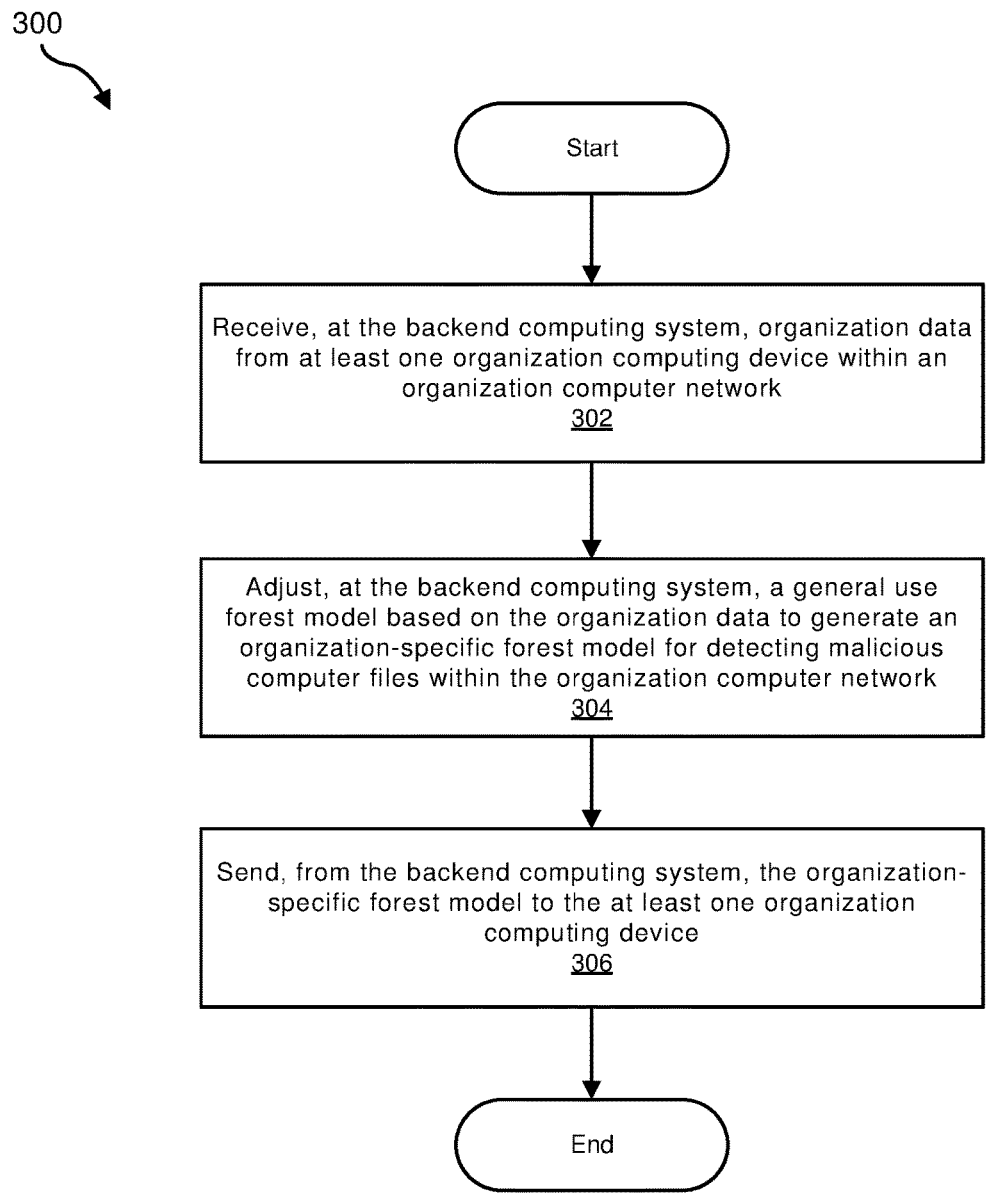
FIG. 3 is a flow diagram of an example method for improving forest-based malware detection within an organization.

FIG. 3 is a flow diagram of an example computer-implemented method 300 for improving forest-based malware detection within an organization. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive, at the backend computing system, organization data from at least one organization computing device within an organization computer network. For example, receiving module 104 may, as part of computing device 202 in FIG. 2, receive, at backend computing system 202, organization data 204 from at least one of organization computing device 230 and organization computing device 240 within organization network 220.

Receiving module 104 may receive organization data 204 in a variety of contexts. For example, receiving module 104 may receive organization data 204 from organization computing device 230 and/or organization computing device 240 via network 204. Organization data 204 for include any suitable type of data for an organization, such as, for example, file data from one or more files on at least one computing device, such as organization computing device 230 and/or organization computing device 240, within organization network 220. Organization computing device 230 and organization computing 240 may be part of any suitable type of organization, without limitation, including a government, business, company, club, institution, society, association, political, and/or any other organized group of individuals and/or computing systems organized for any purpose, without limitation. Organization network 220 may comprise a network that links computing systems particular to and/or related to the organization. In some examples, organization data 204 may include data that is particular to the organization corresponding to organization network 220. In at least one example, organization data 204 may include data that may be found on other computing systems outside of the organization corresponding to organization network 220. For example, organization data 204 may include data that is less frequently encountered on computing systems outside of the organization corresponding to organization network 220.

In some embodiments, one or more of the systems described herein may categorize, at the backend computing system, the organization data from the at least one organization computing device. For example, receiving module 104 may, as part of backend computing system 202, categorize organization data 204 received from at least one of organization computing device 230 and/or organization computing device 240. In one example, organization data 204 may be categorized based on data received from at least one of organization computing device 230 and/or organization computing device 240 indicating whether file data within organization data 204 is clean file data or file data containing malware. In at least one embodiment, organization data 204 may include a set of known data that may be used to discover potentially predictive relationships between the data. In some embodiments, organization data 204 may include ground truth data indicative of information provided by direction observations. In additional embodiments, receiving module 104 may evaluate organization data 204 to categorize organization data 204. For example, receiving module 104 may utilize malware detection and/or categorization heuristics, including but not limited to forest-based heuristics, to evaluate organization data 204.

At step 304, one or more of the systems described herein may adjust, at the backend computing system, a general use forest model based on the organization data to generate an organization-specific forest model for detecting malicious computer files within the organization computer network. For example, adjusting module 106 may, as part of backend computing system 202, adjust general use forest model 206 based on organization data 204 to generate organization-specific forest model 208 for detecting malicious computer files within organization network 220.

Adjusting module 106 may adjust general use forest model 206 in a variety of contexts. For example, adjusting module 106 may utilize organization data 204 to modify one or more aspects of general use forest model 206 to generate organization-specific forest model 208, which exhibits improved malware-detection performance on organization network 220 in comparison to general use forest model 206. In some examples, general use forest model 206 may be adjusted such that organization-specific forest model 208 exhibits higher malware detection accuracy when utilized to evaluate data within organization network 220 in comparison to general use forest model 206. In at least one embodiment, organization-specific forest model 208 may exhibit higher true positive rates and/or lower false positive rates of malware detection in comparison to general use forest model 206 when utilized to evaluate data within organization network 220.

Figure 4:
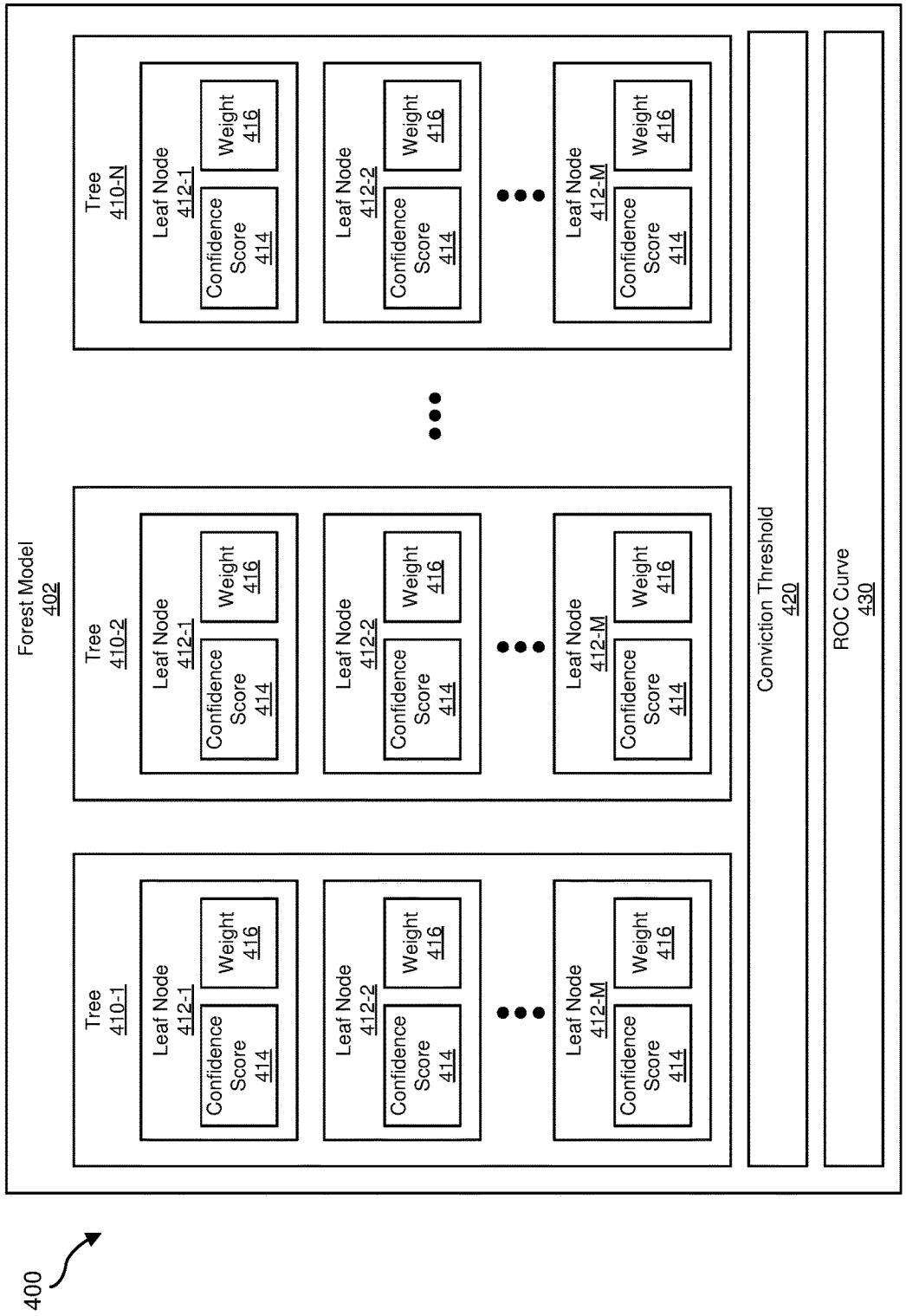
FIG. 4 is a block diagram of an exemplary classification forest model for detecting malware.

In some embodiments, adjusting module 106 may adjust general use forest model 206 by changing, at backend computing system 202, a weight of at least one leaf node of general use forest model 206 to generate organization-specific forest model 206. FIG. 4 is a block diagram illustrating an exemplary forest model 400 according to at least one embodiment. Forest model 400 may represent any suitable forest model for use in malware detection, including, for example, general use forest model 206 and/or organization-specific forest model 206. As illustrated in FIG. 4, forest model 400 may include at least one forest 402. In various embodiments, multiple forest models 400 may be used in conjunction with each other to process file data and determine the likelihood that the file data includes malicious code. Forest model 402 may include any suitable number of trees, without limitation. For example, forest model 402 may include N trees, represented as trees 410-1, 410-2, and 410-N. Each tree may include any suitable number of leaf nodes, without limitation. For example, each of trees 410-1 through 410-N illustrated in FIG. 4 may include M trees, represented as leaf nodes 412-1, 412-2, and 412-M. M may represent the same or different numbers of leaf nodes for each of trees 410-1 through 410-N. Each leaf node 412-1 through 412-M may represent a terminal node of respective trees 410-1 through 410-N. The terminal nodes may each represent a separate final outcome of a classification process performed by each of respective trees 410-1 through 410-N. In some embodiments, each leaf node 412-1 through 412-M may indicate that the data that arrives at the respective leaf node 412-1 through 412-M belongs in a particular class (e.g., malware file or clean file). Branch nodes, which are used in each of trees 410-1 through 410-N to arrive at leaf nodes 412-1 through 412-M are not depicted in FIG. 4.

According to at least one embodiment, each leaf node 412-1 through 412-M may include a particular confidence score 414 indicative of a probability that the data items in the respective leaf node 412-1 through 412-M belong to the particular class indicated by the leaf node. For example, if a leaf node of leaf nodes 412-1 through 412-M with a confidence score of 80% indicates that a file includes malware, the probability that the file actually includes malware may be 80%. Confidence scores 414 may be determined using previously categorized data. For example, general use forest model 206 may include confidence scores that are determined through building and training the trees of general use forest model 206 using categorized data, such as categorized file data, from a sample of files taken from a plurality of computing systems, including computing systems outside of organization network 220.

In at least one example, confidence scores 414 included in leaf nodes 412-1 through 412-M of general use forest model 206 may correspond to and/or be the same values as leaf nodes 412-1 through 412-M of organization-specific forest model 208. In additional examples, confidence scores 414 of leaf nodes 412-1 through 412-M may differ between general use forest model 206 and organization-specific forest model 208. For example, one or more of trees 410-1 through 410-N of general use forest model 206 may be retrained by adjusting module 106 to generate organization-specific forest model 208 having confidence scores 414 for one or more leaf nodes 412-1 through 412-M that differ from the confidence scores 414 for the corresponding one or more leaf nodes 412-1 through 412-M of general use forest model 206.

In one embodiment, one or more of the systems described herein may train or re-train, at the backend computing system, the general use forest model using the organization data. For example, adjusting module 106 may, as part of backend computing system 202, adjust general use forest model 206 based on organization data 204 to generate organization-specific forest model 208 by training or re-training general use forest model 206 using organization data 204 to generate organization-specific forest model 208. In some examples, re-training general use forest model 206 using organization data 204 may generate organization-specific forest model 208 having confidence scores 414 for one or more leaf nodes 412-1 through 412-M that differ from confidence scores 414 for the corresponding one or more leaf nodes 412-1 through 412-M of general use forest model 206.

In some embodiments, at least one of leaf nodes 412-1 through 412-M for at least one of trees 410-1 through 410-N may include a particular weight 416 indicative of a weighting factor applied to the respective leaf node 412-1 through 412-M. Weights 416 may be applied to one or more of leaf nodes 412-1 through 412-M to emphasize or de-emphasize the classification result of the respective leaf nodes 412-1 through 412-M and/or to emphasis or de-emphasis the classification result of the respective trees 410-1 through 410-N. For example, weights may be assigned to leaf nodes of general use forest model 206 and/or organization-specific forest model 208 based on the results of data run through general use forest model 206 and/or organization-specific forest model 208. In at least one example, better performing leaf nodes of leaf nodes 412-1 through 412-M may each be assigned a higher weight. In some examples, leaf nodes 412-1 through 412-M of better performing trees of trees 410-1 through 410-N may each be assigned higher weights. In at least one embodiment, a tree level weight may be applied to one of more of trees 410-1 through 410-N based on the respective classification performance of the one of more trees 410-1 through 410-N.

In various embodiments, one or more of the systems described herein may change, at the backend computing system, a weight of at least one leaf node of the general use forest model to generate the organization-specific forest model. For example, adjusting module 106 may, as part of backend computing system 202, adjust general use forest model 206 based on organization data 204 to generate organization-specific forest model 208 by changing a weight 416 of at least one leaf node 412-1 through 412-M of forest 402 of general use forest model 206 to generate organization-specific forest model 208.

In at least one embodiment, forest 402 may include a specified conviction threshold 420. A conviction threshold 420 may be calculated and assigned to forest 402 of general use forest model 206 and/or organization-specific forest model 208 as an indicator of whether or not data that is run through forest 402 includes malware. In one embodiment, obtaining a classification result satisfying conviction threshold 420 may indicate whether an unknown file is more likely to include malware or to be free from malware. In some examples, conviction threshold 420 may be associated with confidence scores 414 of trees 410-1 through 410-N of forest 402 that are determined by running a set of categorized data down decision trees 410-1 through 410-N. In one embodiment, conviction threshold 420 for forest 402 may be based at least in part on an aggregate of confidence scores 414 for leaf nodes 412-1 through 412-M of decision trees 410-1 through 410-N. For example, conviction threshold 420 may be based at least in part on a summation and/or an average calculation of confidence scores 414 derived from running categorized data through decision trees 410-1 through 410-N.

In one embodiment, one or more of the systems described herein may change, at the backend computing system, a conviction threshold of the general use forest model to generate the organization-specific forest model. For example, adjusting module 106 may, as part of backend computing system 202, adjust general use forest model 206 based on organization data 204 to generate organization-specific forest model 208 by changing conviction threshold 420 of forest 402 of general use forest model 206 to generate organization-specific forest model 208.

In some embodiments, calculating conviction threshold 420 may include calculating true positive and false positive classification rates for each leaf node 412-1 through 412-M of each tree 410-1 through 410-N of forest 402 in conjunction with running categorized data, such as categorized organization data 204, down trees 410-1 through 410-N. In at least one example, a receiver operating characteristic (ROC) curve 430 may generated based on the calculated true positive and false positive classification rates for each leaf node 412-1 through 412-M. In some examples, a value along ROC curve 430 may be calculated in relation to selecting conviction threshold 420. For example, conviction threshold 420 may be adjusted to maximize a true positive detection rate and minimize a false positive detection rate by leaf nodes 412-1 through 412-M of trees 410-1 through 410-N forest 402 of organization-specific forest model 208.

In certain embodiments, one or more of the systems described herein may change, at the backend computing system, the conviction threshold by calculating a conviction threshold for the organization-specific forest model by (i) running, at the backend computing system, the organization data through the general use forest model to determine true positive rates and false positive rates for each leaf node of the general use forest model with respect to the organization data, (ii) generating, at the backend computing system, a receiver operating characteristic curve based on the true positive rates and the false positive rates for each leaf node, and (iii) selecting, at the backend computing system, a position along the receiver operating characteristic curve, the position corresponding to the updated conviction threshold.

For example, adjusting module 106 may, as part of backend computing system 202, change conviction threshold 420 of forest 402 of general use forest model 206 to generate organization-specific forest model 208 by running organization data 204 through general use forest model 206 to determine true positive rates and false positive rates for each leaf node 412-1 through 412-M of general use forest model 206 with respect to organization data 204. Adjusting module 106 may then, as part of backend computing system 202, generate ROC curve 430 based on the true positive rates and the false positive rates for each leaf node 412-1 through 412-M of general use forest model 206. Adjusting module 106 may further, as part of backend computing system 202, select a position along ROC curve 430. The position along ROC curve 430 may correspond to an updated conviction threshold 420 for organization-specific forest model 208. In some examples, the position along ROC curve 430 may be selected such that organization-specific forest model 208 exhibits higher malware detection accuracy when utilized to evaluate data within organization network 220 in comparison to general use forest model 206. In at least one embodiment, the position along ROC curve 430 may be selected such that organization-specific forest model 208 exhibits higher true positive rates and/or lower false positive rates of malware detection in comparison to general use forest model 206 when utilized to evaluate data within organization network 220.

In certain embodiments, one or more of the systems described herein may further evaluate, at the backend computing system, the performance of the general use forest model and/or the organization-specific forest model using organization data from organization network 220. For example, adjusting module 106 may evaluate, at backend computing system 202, the performance of general use forest model 206 with respect to organization data 204 by running organization data 204 through general use forest model 206 and comparing the resulting classifications determined by general use forest model 206 to known classifications for the organization data 204. In one example, receiving 104 may receive, at the backend computing system 202, additional organization data from at least one of organization computing device 230 and organization computing device 240 within organization network 220. Adjusting module 106 may then evaluate, at backend computing system 202, the performance of organization-specific forest model 208 with respect to the additional organization data by running the additional organization data through organization-specific forest model 208 and comparing the resulting classifications determined by organization-specific forest model 208 to known classifications for the additional organization data.

In some embodiments, the organization-specific forest model may be utilized to identify malicious or potentially malicious computer files. For example, organization-specific forest model 208 may be used to analyze a file received on a computing system, such as organization computing device 230 and/or organization computing device 240, within organization network 220. In one embodiment, security module 110 may run data from the file through organization-specific forest model 208 on backend computing system 202, organization computing device 230, and/or organization computing device 240, and the results may indicate that the file likely includes malicious code. Security module 110 may determine, based on the results, that the file includes, or likely includes, malware. Security module 110 may then proceed to perform a security action to protect backend computing system 202, organization computing device 230, organization computing device 240, and/or any other computing device or system connected to network 204 and/or organization network 220. In some examples, security module 110 may perform a security action at backend computing system 202 to prevent the file from performing any actions on backend computing system 202, organization computing device 230, organization computing device 240, and/or any other computing device or system connected to network 204. Security module 110 may also perform a security action by, for example, alerting an administrator to the potential maliciousness of the file, quarantining the file, deleting the file, blocking downloads of the file, and/or warning a computing device user about the file. In at least one example, security module 110 may perform a security action by blacklisting URLs and/or IP addresses associated with the file.

As explained above in connection with method 300 in FIG. 3, the systems and methods described herein may improve early detection and prevention of malware attacks within an organization by optimizing classification forest performance for the organization. By utilizing computer files from the organization to adjust classification forests to generate organization-specific forests for use in the organization, the described systems and methods may improve the accuracy of the forests in detecting malware threats in the organization by increasing the number of true positive classification results and reducing the number of false positive classification results. Because the systems and methods described herein leverage existing general use forest models to generate organization-specific forest models that are optimized to the malware detection activities of particular organizations, the systems and methods may efficiently and effectively build off existing forest models. Accordingly, the described systems and methods may eliminate the need to build new forest models from the ground up in order to meet the growing malware detection needs of various organizations.

The systems and methods described herein may improve the functioning of a computing device by facilitating early detection of malware, thereby improving the security of the computing device and reducing time and resources expended to repair the computing device in the event that it is compromised by malware. These systems and methods may also improve the field of computer security by optimizing forest performance through the utilization of existing malware detection heuristics that are adjusted using data specific to particular organizations in order to better detect malware within the organizations.

Figure 5:
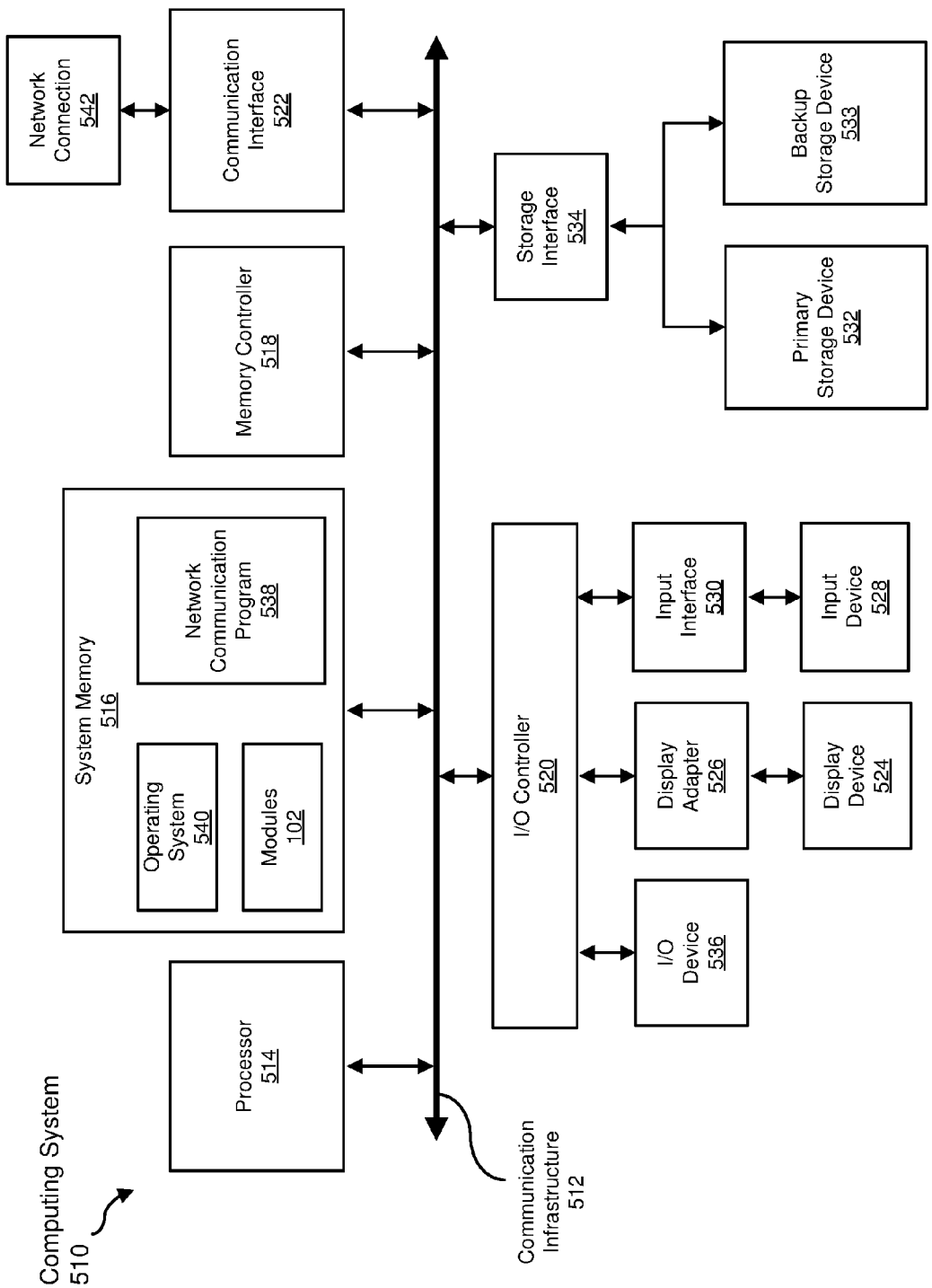
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
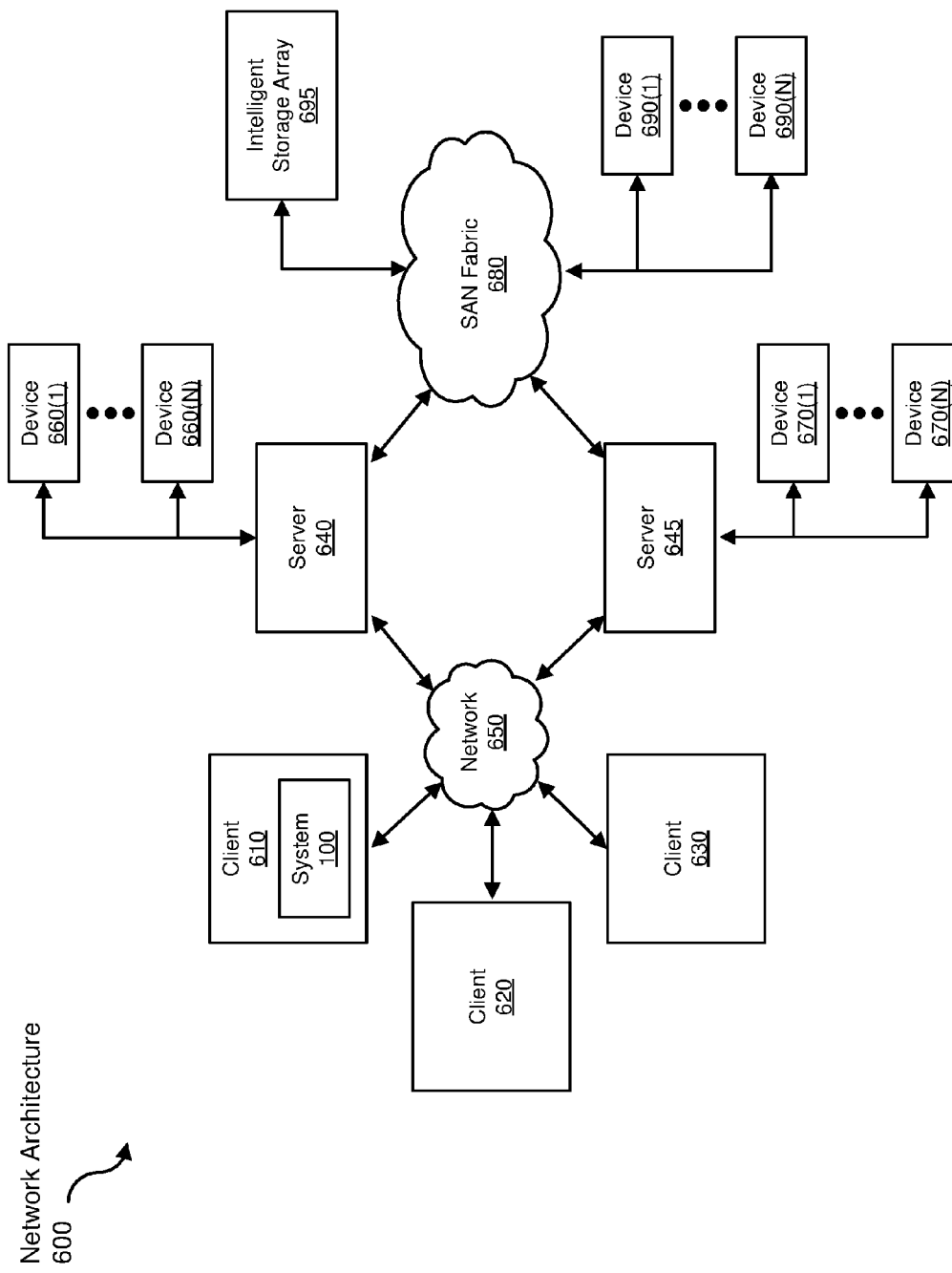
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for improving forest-based malware detection within an organization.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive general use forest model data and organization data to be transformed, transform the general use forest model data into organization-specific forest model data using the organization data, output a result of the transformation to an organization computing device within an organization network, use the result of the transformation to detect malware within the organization network, and store the result of the transformation to a backend computing system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving forest-based malware detection within an organization, at least a portion of the method being performed by a backend computing system comprising at least one processor, the method comprising:

receiving, at the backend computing system, organization data from at least one organization computing device within an organization computer network;

adjusting, at the backend computing system, a general use forest model to generate an organization-specific forest model for detecting malicious computer files within the organization computer network, wherein adjusting the general use forest model comprises changing a weight of at least one leaf node of the general use forest model based on the organization data;

sending, from the backend computing system, the organization-specific forest model to the at least one organization computing device;

detecting, by the backend computing system the at least one organization computing device, using the organization-specific forest model, malware in a file received on the at least one organization computing device within the organization computer network; and performing a security action with respect to the file to protect the backend computing system or the at least one organization computing device or both.

2. The computer-implemented method of claim 1, wherein adjusting the general use forest model further comprises changing a conviction threshold of the general use forest model, wherein changing the conviction threshold of the general use forest model comprises calculating a conviction threshold for the organization-specific forest model by:

running, at the backend computing system, the organization data through the general use forest model to determine true positive rates and false positive rates for each leaf node of the general use forest model with respect to the organization data;

generating, at the backend computing system, a receiver operating characteristic curve based on the true positive rates and the false positive rates for each leaf node; and selecting, at the backend computing system, a position along the receiver operating characteristic curve, the position corresponding to the updated conviction threshold.

3. The computer-implemented method of claim 1, wherein adjusting the general use forest model comprises training, at the backend computing system, the general use forest model using the organization data.

4. The computer-implemented method of claim 1, further comprising:

receiving, at the backend computing system, additional organization data from the at least one organization computing device within the organization computer network; and evaluating, at the backend computing system, performance of the organization-specific forest model with respect to the additional organization data by running the additional organization data through the organization-specific forest model.

5. The computer-implemented method of claim 1, wherein the organization data comprises file data of at least one computer file from the at least one organization computing device.

6. The computer-implemented method of claim 5, further comprising categorizing, at the backend computing system, the file data of the at least one computer file.

7. The computer-implemented method of claim 1, wherein the general use forest model comprises a forest model that was generated and trained using data from sources outside the organization computer network.

8. The computer-implemented method of claim 1, wherein adjusting the general use forest model comprises adjusting, at the backend computing system, the general use forest model based on the organization data to generate an organization-specific forest model that exhibits at least one of higher true positive rates and lower false positive rates in comparison to the general use forest model when utilized to evaluate data within the organization computer network.

9. The method of claim 1, further comprising determining that a computer file includes malware based on an analysis of the computer file using the organization-specific forest model.

10. The method of claim 9, further comprising performing a security action to protect the at least one organization computing device when the computer file is determined to include malware.

11. The method of claim 1, wherein the general use forest model and the organization-specific forest model are each random forests.

12. The method of claim 1, further comprising categorizing, at the backend computing system, the organization data received from the at least one organization computing device.

13. A system for improving forest-based malware detection within an organization the system comprising:

a receiving module, stored in memory, that receives, at a backend computing system, organization data from at least one organization computing device within an organization computer network;

an adjusting module, stored in memory, that adjusts, at the backend computing system, a general use forest model to generate an organization-specific forest model for detecting malicious computer files within the organization computer network, wherein the adjusting module adjusts the general use forest model by changing a weight of at least one leaf node of the general use forest model based on the organization;

a sending module, stored in memory, that sends, from the backend computing system, the organization-specific forest model to the at least one organization computing device;

a security module, stored in memory, that:

detects, from the backend computing system or the at least one organization computing device, using the organization-specific forest model, malware in a file received on the at least one organization computing device within the organization computer network; and performs a security action with respect to the file to protect the backend computing system or the at least one organization computing device or both; and at least one processor that executes the receiving module, the adjusting module, and the sending module.

14. The system of claim 13, wherein the adjusting module adjusts the general use forest model by training, at the backend computing system, the general use forest model using the organization data to generate the organization-specific forest model.

15. The system of claim 13, wherein the adjusting module further adjusts the general use forest model by changing a conviction threshold of the general use forest model, wherein changing the conviction threshold of the general use forest model comprises calculating a conviction threshold for the organization-specific forest model by:

running, at the backend computing system, the organization data through the general use forest model to determine true positive rates and false positive rates for each leaf node of the general use forest model with respect to the organization data;

generating, at the backend computing system, a receiver operating characteristic curve based on the true positive rates and the false positive rates for each leaf node; and selecting, at the backend computing system, a position along the receiver operating characteristic curve, the position corresponding to the updated conviction threshold.

16. A non-transitory computer-readable medium comprising one or more computer-executable instructions that, when executed by at least one processor of a backend computing system, cause the backend computing system to:
- receive, at the backend computing system, organization data from at least one organization computing device within an organization computer network;
- adjust, at the backend computing system, a general use forest model to generate an organization-specific forest model for detecting malicious computer files within the organization computer network, wherein the general use forest model is adjusted by changing a weight of at least one leaf node of the general use forest model based on the organization data
- send, from the backend computing system, the organization-specific forest model to the at least one organization computing device;
- detect, by the backend computing system or the at least one organization computing device, using the organization-specific forest model, malware in a file received on the at least one organization computing device within the organization computer network; and
- perform a security action with respect to the file to protect the backend computing system or the at least one organization computing device or both.

17. The non-transitory computer-readable medium of claim 16, wherein the one or more computer readable instructions further cause the backend computing system to adjust the general use forest model by changing a conviction threshold of the general use forest model, wherein changing the conviction threshold of the general use forest model comprises calculating a conviction threshold for the organization-specific forest model by:
- running, at the backend computing system, the organization data through the general use forest model to determine true positive rates and false positive rates for each leaf node of the general use forest model with respect to the organization data;
- generating, at the backend computing system, a receiver operating characteristic curve based on the true positive rates and the false positive rates for each leaf node; and
- selecting, at the backend computing system, a position along the receiver operating characteristic curve, the position corresponding to the updated conviction threshold.

* * * * *